United States Patent [19]

Anderson

[11] Patent Number: 4,521,547

[45] Date of Patent: Jun. 4, 1985

[54] HIGHLY FLAME RESISTANT RIGID URETHANE-ISOCYANURATE FOAM COMPOSITIONS

[75] Inventor: James J. Anderson, Richmond, Va.

[73] Assignee: Mobil Oil Corporation, New York, N.Y.

[21] Appl. No.: 567,996

[22] Filed: Jan. 4, 1984

[51] Int. Cl.$^3$ ............................................. C08G 18/14
[52] U.S. Cl. ................................. 521/137; 521/168; 521/169
[58] Field of Search .................. 521/137, 168, 169

[56] References Cited

U.S. PATENT DOCUMENTS

| | | | |
|---|---|---|---|
| 3,525,705 | 8/1970 | Harowitz | 521/169 |
| 3,647,759 | 3/1972 | Walker | 528/305 |
| 4,051,082 | 9/1977 | Cenker et al. | 521/169 |
| 4,237,238 | 12/1980 | DeGuiseppi et al. | 521/131 |
| 4,390,644 | 6/1983 | Clarke et al. | 521/117 |

Primary Examiner—Maurice J. Welsh
Attorney, Agent, or Firm—Alexander J. McKillop; Michael G. Gilman; Edward J. Trojnar

[57] ABSTRACT

Highly flame resistant rigid urethane-isocyanurate foams which meet the German B-1 rating are prepared from compositions containing blowing agent, polyester polyol derived from the residue of dimethyl terephthalate or terephthalic acid production, a phosphorus containing polyol and an isocyanurate catalyst, in which the NCO:OH ratio is 3 to 6.

9 Claims, No Drawings

HIGHLY FLAME RESISTANT RIGID URETHANE-ISOCYANURATE FOAM COMPOSITIONS

SUMMARY OF THE INVENTION

This invention is directed to compositions for the preparation of highly flame resistant rigid urethane-isocyanurate foams which meet the class B1 requirements for the German Flammability Test Method DIN-4102, a very stringent test. The compositions comprise a polyester polyol, a phosphorus containing polyol and polyisocyanate in which the NCO:OH mole ratio is from 3:1 to 6:1.

DETAILED DESCRIPTION OF THE INVENTION

The compositions of this invention comprise:
I. a blowing agent;
II. a polyester polyol mixture prepared by:
  (a) transesterification, with a glycol of molecular weight from about 60 to about 400, of a residue remaining after dimethyl terephthalate and methyl p-toluate have been removed from the product of oxidation of p-xylene in the preparation of dimethyl terephthalate; or
  (b) esterification, with an alkylene oxide selected from the group consisting of ethylene oxide, propylene oxide, butylene oxide, and mixtures thereof, of a carboxyl functional residue resulting from the removal of terephthalic acid from the mixture obtained by the oxidation of p-xylene in the preparation of terephthalic acid;
III. a phosphorus containing polyol;
IV. a polymeric polyisocyanate;
V. an isocyanurate catalyst; and (optionally)
VI. urethane catalyst; in which the NCO:OH mole ratio is 3:1 to 6:1.

The "residue" from which the polyester polyol component II is prepared is described in more detail in U.S. Pat. Nos. 3,647,759 and 4,237,238. The residue is the product remaining after dimethyl terephthalate and methyl p-toluate have been removed from the product of oxidation of p-xylene in the preparation of dimethyl terephthalate. Alternatively, the residue can comprise the product remaining after the removal of terephthalic acid from the mixture obtained by the oxidation of p-xylene in the preparation of terephthalic acid. In the first case, the residue contains ester groups which are transesterified with a glycol such as ethylene glycol in order to prepare the polyester polyol. In the latter case, the residue contains carboxyl groups which can be esterified with an alkylene oxide such as ethylene oxide, propylene oxide or butylene oxide to prepare a similar polyester polyol mixture.

Suitable phosphorus containing polyols III include those disclosed in U.S. Pat. No. 3,525,705 which is incorporated herein by reference in entirety. A particularly preferred phosphorus containing polyol is the propylene oxide adduct of dibutyl pyrophosphoric acid described in Example X1 of the patent. The amount of phosphorus containing polyol III used is selected to achieve the desired Class B1 flame resistance. Generally this amount corresponds to a weight ratio of polyester polyol II to phosphorus polyol of 4:1 to 10:1.

The polymeric polyisocyanates preferred for use in this invention are polymethylene poly(phenyl isocyanates) which are commercially available materials.

A variety of catalysts which promote the formation of isocyanurate groups during the curing reaction are known and commercially available. For example, salts of higher fatty acids such as amine and potassium salts, e.g. potassium octoate, are suitable isocyanurate catalysts.

The urethane catalyst is optional. A variety of catalysts which promote the formation of urethane groups are known and are commercially available.

An epoxide is also an optional ingredient which has been found to be beneficial in reducing foam shrinkage. Bisphenol epoxides, particularly those based on bisphenol A, available commercially are preferred. The epoxide is generally present in an amount of 2% or less.

The foam compositions of this invention may contain additional flame retardant, preferably organic compounds containing both halogen and phosphorus. Tris(-beta-chloropropyl)phosphate is particularly preferred.

The blowing agent is not critical to this invention. Halogenated organic blowing agents are customarily used. Preferred blowing agents are trichlorofluoromethane and dichlorodifluoromethane.

The high ratio of isocyanate equivalents in the organic polyisocyanate and the total hydroxyl equivalents in components II and IV is important to this invention. Generally, the NCO:OH ratio is in the range of 3:1 to 6:1 and preferably in the range of 3:1 to 4:1.

It has been found that the addition of non-ionic surfactant is often beneficial. Suitable surfactants are well known in the art. The non-ionic surfactant is not a necessary ingredient of the compositions of this invention and, when used, should be present in a maximum of about 2 weight percent to prevent loss of desirable foam properties.

The compositions of this invention are particularly useful for the preparation of rigid urethane-isocyanurate foams which are in particular, the compositions of this invention are suitable to meet the stringent requirements for a Class B1 rating under the German Flammability Test method DIN-4102.

A representative foam composition in accordance with this invention is described in the example, which is illustrative and non-limiting. All amounts are expressed in parts by weight unless otherwise stated.

EXAMPLE

To a six gallon pail was added 3,282 grams Terate 203, 636.9 grams of the propylene oxide adduct of dibutyl pyrophosphoric acid (Example XI, U.S. Pat. No. 3,525,705), 134.6 grams Epon 828 (Shell Chemical Co.—an epoxide resin based on bis-phenol A), 91.9 grams DC-193 surfactant, 105 grams polyisocyanurate catalyst, X-798 (Air Products), 55.8 grams dimethylethanolamine and 2,275.1 grams of trichloromonofluoromethane (R-11). The mixture was stirred using a two blade, propeller stirrer powered by a 0.25 HP drill at 1,500 RPM.

After replacing the R-11 lost due to evaporation, 10,935.7 grams of polymethylene poly(phenyl isocyanate) were added followed by vigorous agitation as above for 22 seconds. The mixture was poured into a 48"×48"×12" cardboard box and was allowed to free rise. The homogenous mixture creamed after five seconds and was fully risen in 103 seconds.

The bun was allowed to stand at room temperature for 48 hours prior to trimming and cutting for flame testing according to the DIN-4102 test method.

The NCO/OH ratio of the above formulation was 4.0 and the flame retardant polyol concentration was 3.6% based on total formulation weight. A non-brittle foam was produced having a core density of 30 kg/M$^3$.

A B1 rating was obtained when the above foam was tested by the DIN-4102 method at sample thickness of 40 MM. The average of three tests showed 22 cm of unburned or uncharred sample and 148° C. flue gas temperature, compared to B1 specifications of 15 cm minimum and 200° C. maximum, respectively.

The several components used in the composition are specifically identified as follows.

The polymeric polyisocyanate is a polymethylene poly(phenyl isocyanate) with an average functionality of about 2.5 and an NCO content of 32 percent.

Terate 203 commercially available from Hercules Inc. and is believed to be a product prepared by transesterification of the residue of a dimethyl terephthalate esterfied oxidate reaction product with an excess of diethylene glycol, as described in U.S. Pat. No. 3,647,759 and U.S. Pat. No. 4,237,238 which are incorporated herein by reference.

DC 193 is a silicone surfactant commercially available from Dow Corning Chemical, X-798 Catalyst is an isocyanurate catalyst, commercially available from Air Products.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the following claims.

I claim:

1. A composition curable to a highly flame resistant polymer foam comprising:
    I. a blowing agent;
    II. a polyester polyol prepared by
        (a) transesterification, with a glycol of molecular weight from about 60 to about 400, of a residue remaining after dimethyl terephthalate and methyl p-toluate have been removed from the product of oxidation of p-xylene in the preparation of dimethyl terephthalate; or
        (b) esterification, with an alkylene oxide selected from the group consisting of ethylene oxide, propylene oxide, butylene oxide, and mixtures thereof, of a carboxyl functional residue resulting from the removal of terephthalic acid from the mixture obtained by the oxidation of p-xylene in the preparation of terephthalic acid.
    III. a propylene oxide adduct of a di(lower alkyl)-pyrophosphoric acid;
    IV. a polymeric polyisocyanate; and
    V. an isocyanurate catalyst; in which the NCO:OH mole ratio is 3:1 to 6:1.

2. The composition of claim 1 in which the NCO:OH mole ratio is 3:1 to 4:1.

3. The acid composition of claim 1 in which said phosphorus containing polyol III is a propylene oxide adduct of a dibutyl pyrophosphoric acid.

4. The composition of claim 1 in which said polymeric polyisocyanate IV is a polymethylene poly(phenyl isocyanate).

5. The composition of claim 1 which contains in addition a bisphenol epoxy resin.

6. The composition of claim 1 in which the weight ratio of polyester polyol II to phosphorus containing polyol III is 4:1 to 10:1.

7. The composition of claim 1 in which
    said phosphorus containing polyol III is a propylene oxide adduct of dibutyl pyrophosphoric acid;
    said polymeric polyisocyanate IV is a polymethylene poly(phenyl isocyanate); and
    the weight ratio of polyester polyol II to phosphorus containing polyol III is 4:1 to 10:1.

8. The composition of claim 7 which contains, in addition, a bisphenol epoxy resin.

9. The composition of claim 1 cured to a rigid isocyanurate-urethane foam which meets the Class B-1 rating under the German Flammability Test Method DIN-4102.

* * * * *